3,238,184
4-(EPOXYALKYL) METHYL ESTERS OF TRIMELLITIC ANHYDRIDES AND HOMOPOLYMERS THEREOF
James R. Stephens, Gary, and Richard E. Van Strien, Griffith, Ind., assignors to Standard Oil Company, Chicago, Ill., a corporation of Indiana
No Drawing. Filed Apr. 10, 1963, Ser. No. 271,876
4 Claims. (Cl. 260—78.4)

This invention pertains to a new class of chemicals. More particularly, our invention is a novel class of compounds which possess both anhydride and epoxide groups within their structures. These novel compositions are the 4-(epoxyalkyl) methyl esters of trimellitic anhydride.

The general structural formula for our novel class of chemicals is set out below:

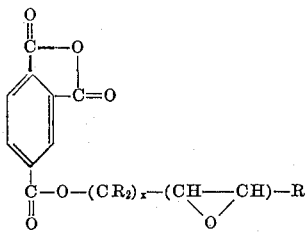

wherein $x$ is a number from 1 to about 10 and R is hydrogen or an alkyl radical containing from 1 to about 10 carbon atoms. As a result of the existence of two reactive groups, viz. anhydride and epoxide, which can readily undergo reactions well known to this art, e.g. with glycols, acids, other anhydrides and epoxides, and the like, the compounds of our invention are useful in the preparation of a variety of resinous materials. They can undergo homopolymerization as well as co-polymerization. Further, a number of modified monomeric derivatives of our novel compounds, capable of undergoing copolymerization with poly-functional compounds to provide modified resins, can be made. For example, the anhydride group can be esterified by known methods with monoalcohols, and copolymerization of the resulting molecule can then be accomplished by way of the epoxide group. Also, the epoxide group can be the site of modification of the 4-(epoxyalkyl) methyl esters, as through ether formation, esterification, hydration and like reactions, and useful monomers capable of copolymerization and of homopolymerization can be obtained therefrom.

The number of carbon atoms in the epoxide-containing carbon chain of our novel esters is not critical with regard to the usefulness of these esters. Their particular utility arises from the presence of the epoxide group in the carbon chain and not from the number of carbon atoms in that chain. For ease of preparation of the esters and greater availability of starting materials, however, the lower carbon chains are desirable, and we prefer to use those containing from about 3 to about 14 carbon atoms. Typical epoxy alkanols useful in the preparation of our novel compounds are such as: 2,3-epoxy-1-butanol; 2,3-epoxy-1-hexanol; 2,3-epoxy-1-decanol; 2,3-epoxy-1-hexadecanol; 2,3-epoxy-1-eicosanol; 5,6-epoxy-1-hexanol; 7,8-epoxy-1-octanol; 5,6-epoxy-2-hexanol; 9,10-epoxy-3-dodecanol; 7,8 - epoxy-5-methyl-2-octanol; 5,6-epoxy-3,3-dimethyl-1-hexanol; and the like.

Polymerized derivatives of our novel class of chemicals are valuable for use in adhesives, coating compositions, films, as binders in reinforced plastics, and the like. The resinous derivatives of our novel compounds, as a result of the polyfunctional configuration, can be prepared so as to obtain specific desirable mechanical and chemical properties in the polymer end products. Our novel compounds are especially useful as a source of cross-linking, which results in thermosetting resins, when employed in copolymerizations. These novel compounds are especially advantageous for use as cross-linking agents inasmuch as they eliminate no gaseous products in the cross-linking reactions.

The preparation of our novel chemicals can be effected generally by reacting equimolar quantities of 4-trimellityl chloride anhydride and an epoxy alkanol. The reaction is suitably performed in a solvent inert to the reactants, of which dioxane is a useful example, and others of which are known to those skilled in this art. The reactants are heated at a temperature ranging from about 40° C. to about 100° C. and suitably from about 55° C. to about 75° C. Higher temperatures may be employed, in which case elevated pressures or reflux may be necessary to avoid loss of reactants and solvents. Care should be taken to avoid temperatures so high as to cause condensation reactions of the reactants and the desired product, or homopolymerization of the product. The progress of the reaction can be accurately measured by determining the evolution of hydrogen chloride from the reaction mixture. Crude product, suitable for use without further purification can be obtained by evaporation of the solvent, preferably under vacuum. Purification of the crude product can be effected by recrystallization from a solvent, of which n-heptane is examplary.

The preparation of 4-glycidly trimellitate was performed as follows:

To 5.26 g. (0.025 mole) of 4-trimellityl chloride anhydride was added 1.8 g. (0.025 mole) of glycidol (2,3-epoxy-1-propanol) in 5 ml. of dioxane. This mixture was heated with stirring in a round bottom flask at a temperature of about 50 to 60° C. for about 30 minutes. The progress of the reaction was followed by the evolution of gaseous hydrogen chloride from the mixture. This gas evolution is preferably facilitated by purging the reaction mixture with an inert gas stream such as nitrogen. When no further evolution of hydrogen chloride was apparent, the dioxane was evaporated under vacuum at room temperature and there was obtained an essentially quantitative yield of 4-glycidyl trimellitate anhydride. This product had a melting point of about 220° C. The product thus prepared can be used without further purification for the preparation of various derivatives such as those described above and as will be set forth hereinafter. If further purification is desirable for specific uses, this can be accomplished by recrystallization from n-heptane.

A sample of 4-glycidyl trimellitate anhydride prepared as described above was dissolved in dioxane and treated with a catalytic amount of anhydrous sodium methoxide. The dioxane solution was warmed gently to induce a base-catalyzed homopolymerization of the 4-glycidyl trimellitate anhydride. The viscosity of the dioxane solution increased with time and then remained constant. When no further viscosity increase was apparent, the dioxane solvent was evaporated and a hard, resinous homopolymer was obtained which had an initial softening point of 30° C. After exposing the initial homopolymer to air for about 16 hours, the resulting polymer had a melting point of about 120° C. The cured resinous homopolymer can be used as a potting composition for electrical components as is, or may be blended with other materials for use in films, reinforced resins and the like.

The homopolymers of other 4-(epoxyalkyl) methyl esters of trimellitic anhydride can be made according to the same procedure, and are likewise useful in potting compositions, plastic blends, reinforced resins and the like.

Having thus described our invention, we claim:
1. Compounds of the formula:

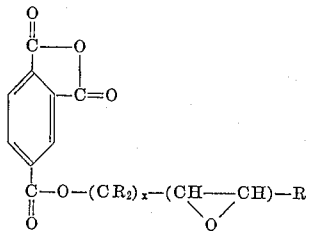

wherein $x$ is a number from 1 to 6 and R is a member of the group consisting of hydrogen and alkyl radicals containing from 1 to 6 carbon atoms.

2. Homopolymers of compounds of the formula:

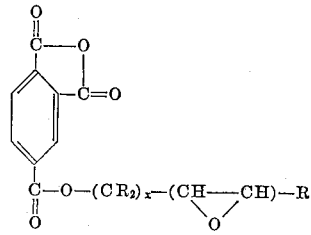

wherein $x$ is a number from 1 to 6 and R is a member of the group consisting of hydrogen and alkyl radicals containing from 1 to 6 carbon atoms.

3. 4-glycidyl trimellitate anhydride.
4. Homopolymeric 4-glycidyl trimellitate anhydride.

References Cited by the Examiner
UNITED STATES PATENTS 2,761,870  9/1956  Payne et al. _____ 260—78.4
2,870,170  1/1959  Payne et al. _____ 260—78.4

OTHER REFERENCES

Amoco, "Trimellitic Anhydride," Bulletin 2571-3-62.

JOSEPH L. SCHOFER, *Primary Examiner.*
DONALD E. CZAJA, *Examiner.*